United States Patent Office 2,948,754
Patented Aug. 9, 1960

2,948,754

ARYLOXY ACETIC ACID AMIDES

Franz Litvan and Willy Stoll, Basel, Switzerland, assignors to Geigy Chemical Corporation, New York, N.Y., a corporation of Delaware No Drawing. Filed Nov. 4, 1957, Ser. No. 694,129

Claims priority, application Switzerland Nov. 9, 1956

3 Claims. (Cl. 260—559)

The present invention is concerned with new derivatives of aryloxy acetic acids having valuable pharmacological properties and with processes for the production thereof.

Aryloxy acetic acid amides substituted in the amide group by hydrocarbon radicals corresponding to the general formula:

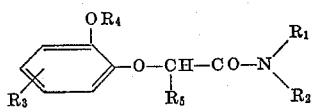

wherein:

$R_1$ represents a member selected from the group consisting of lower alkyl, lower alkenyl, cycloalkyl, phenyl, halogenphenyl, lower alklphenyl, lower alkoxyphenyl, benzyl, halogenbenzyl, lower alklbenzyl, lower alkoxybenzyl radicals, and $R_2$ represents a member selected from the group consisting of hydrogen, lower alkyl and lower alkenyl radicals and $R_1$ and $R_2$ taken jointly represent a member selected from the group consisting of a tetramethylene, pentamethylene and ethylene-oxethylene radical, $R_3$ represents an alkyl radical, $R_4$ represents a lower alkyl radical, and $R_5$ represents a member selected from the group consisting of hydrogen and a lower alkyl radical, have not been known up to now.

Surprisingly it has now been found that these compounds have valuable pharmacological properties, in particular hypnotic, sedative, anticonvulsive and anaesthetic activity.

The compounds defined above are produced, for example, by reacting an aryloxy acetic acid of the general formula:

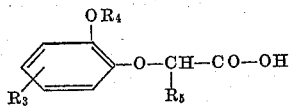

wherein $R_3$, $R_4$ and $R_5$ have the meanings given above, or a reactive functional derivative of such an acid with a primary or secondary amine of the general formula:

wherein $R_1$ and $R_2$ have the meanings given above.

Examples of suitable reactive functional derivatives of aryloxy acetic acids of the general Formula II are the halides thereof and mixed anhydrides with low aliphatic carboxylic acids, in particular acetic acid as well as the esters thereof, in particular the low alkyl esters and the phenyl ester thereof.

The reactions are performed advantageously in solvents or diluents. Both inert organic solvents such as ether or benzene hydrocarbons and also water can be used for the reactions with acid halides and anhydrides. Also alcohols can be used for the reactions with acid esters. In reactions with acid halides or mixed anhydrides in organic solvents, an excess of the amine used for the reaction or also a tertiary organic base such as pyridine or dimethyl aniline can be used as acid binding agents. If the reaction is performed in water, also inorganic substances such as sodium or potassium carbonate can be used.

Examples of aryloxy acetic acids of the general Formula II which can be used according to the present invention as components of compounds of the general Formula I are 2-methoxy-4-methyl phenoxy acetic acid, 2-methoxy-4-ethyl phenoxy acetic acid, 2-methoxy-4-n-propyl phenoxy acetic acid, 2-methoxy-4-n-butyl phenoxy acetic acid, 2-methoxy-4-n-amyl phenoxy acetic acid, 2-methoxy-4-isoamyl phenoxy acetic acid, 2-methoxy-4-n-hexyl phenoxy acetic acid, 2-methoxy-4-n-heptyl phenoxy acetic acid, 2-methoxy-4-n-octyl phenoxy acetic acid, 2-ethoxy-4-ethyl phenoxy acetic acid, 2-ethoxy-4-n-propyl phenoxy acetic acid, 2-ethoxy-4-n-butyl phenoxy acetic acid, 2-n-butoxy-4-n-propyl phenoxy acetic acid, 2-methoxy-5-ethyl phenoxy acetic acid, 2-methoxy-5-n-propyl phenoxy acetic acid, 2-methoxy-5-n-butyl phenoxy acetic acid, 2-methoxy-5-n-amyl phenoxy acetic acid, 2-ethoxy-5-n-propyl phenoxy acetic acid, 2-methoxy-6-ethyl phenoxy acetic acid, 2-methoxy-6-n-propyl phenoxy acetic acid, 2-methoxy-6-n-butyl phenoxy acetic acid, 2-methoxy-6-n-amyl phenoxy acetic acid and 2-ethoxy-6-n-propyl phenoxy acetic acid, α-(2-methoxy-4-n-propylphenoxy)-propionic acid and α-(2-methoxy-4-n-propylphenoxy)-butyric acid.

Methylamine, ethylamine, n-propylamine, isopropylamine, n-butylamine, isobutylamine, sec. butylamine, n-amylamine, isoamylamine, n-hexylamine, allylamine, methallylamine, cyclophentylamine, cyclohexylamine, cycloheptylamine, aniline, o-toluidine, m-toluidine, p-toluidine, benzylamine, β-phenyl-ethylamine, dimethylamine, methyl-ethylamine, diethylamine, methyl-n-propylamine, methyl-isopropylamine, di-n-propylamine, methyl-n-butylamine, methyl-isobutylamine, di-n-butylamine, di-isobutylamine, methyl-allylamine, ethylallylamine, diallylamine, methyl-methallylamine, dimethallylamine, N-methyl-cyclohexylamine, N-methyl-benzylamine, dibenzylamine, pyrrolidine, piperidine, 2-methyl-piperidine, morpholine and N-alkyl- or N-alkenyl- arylamines such as N-methyl-, N-ethyl-, N-n-propyl-, N-isopropyl-, N-n-butyl-, N-isobutyl-, N-sec. butyl-, N-n-amyl-, N-isoamyl-, N-n-hexyl-, N-allyl-, N-crotyl- and N-methallyl- aniline, -o-toluidine, -m-toluidine, -p-toluidine, -3,4-dimethyl aniline, -2.4-dimethyl aniline, -2.5-dimethyl aniline, -2.6-dimethyl aniline, -mesidine, -4-ethyl aniline, -4-tert. butyl aniline, -2-chloraniline, -3-chloraniline, -4-chloraniline, -2.5-dichloraniline, -4-bromaniline, -o-anisidine, -m-anisidine, -p-anisidine and -p-phenetidine are examples of starting materials of the general Formula III.

A modification of the production process defined above which is suitable for the production of N.N-disubstituted amides consists in reacting a carbaminyl chloride of the general formula:

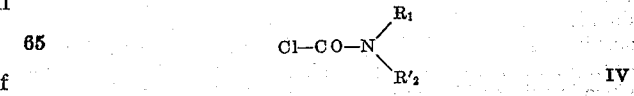

wherein:

$R_1$ has the meaning given above, and $R'_2$ has the meaning given above but excluding hydrogen, in the warm with a salt of an aryloxy acetic acid of the general Formula II, in particular in alkali salt. The desired N.N-disubstituted amides are formed under development of carbon dioxide and separation of the corresponding chlorides, for example alkali metal chlorides. The carbaminyl chlorides derived from the secondary amines of the general Formula III mentioned above can be used, for example, as starting materials of the general Formula IV.

A further method of producing the new amides defined consists in reacting a halogen acetamide of the general formula:

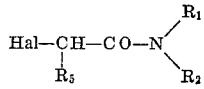

V wherein:

Hal represents a halogen atom and
$R_1$, $R_2$ and $R_5$ have the meanings given above, with an alkoxy alkyl phenol of the general formula:

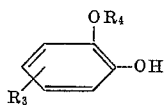

VI wherein $R_3$ and $R_4$ have the meanings given above, in the presence of an acid binding agent, or with a salt of such a phenol, in particular an alkali metal salt. Examples of amides of the general Formula V suitable for the reaction are the N-chloracetyl-, N-bromacetyl-, N-($\alpha$-chloropropionyl)-, N-($\alpha$-bromopropionyl)- and N-($\alpha$-bromobutyryl)- derivatives of the amines of the general formula III listed above which can be reacted, for example, with 2-methoxy-4-methyl phenol, 2-methoxy-4-ethyl phenol, 2-methoxy-4-n-propyl phenol, 2-ethoxy-4-n-propyl phenol, 2-butoxy-4-ethyl phenol, 2-methoxy-5-n-propyl phenol, 2-methoxy-6-ethyl phenol and 2-methoxy-6-n-propyl phenol or with the alkali metal salts thereof.

Finally, the new amides of the general Formula I can also be obtained by reacting aryloxy acetic acid amides of the general formula:

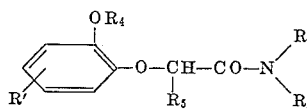

VII wherein $R'_3$ represents an alkenyl radical and $R_1$, $R_2$ $R_4$ and $R_5$ have the meanings given above, with catalytically activated hydrogen until one mol has been taken up. The amides of the general Formula VII can be obtained by a process analogous to the three previous processes given for the production of compounds of the general Formula I by using derivatives of acids of the general formula:

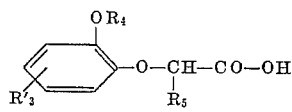

VIII instead of derivatives of the acids of the general Formula II. This process is naturally of less use for the production of such compounds of the general Formula I which may contain the radicals $R_1$ and/or $R_2$ having double linkages which are easily hydrogenated. On the other hand, such double linkages can be hydrogenated at the same time as that of the radical $R'_3$ if it is not desired that the end product should contain any such double linkages in the radicals $R_1$ and $R_2$. Suitable starting materials of the general Formula VII are, for example, the N-mono- and N.N-disubstituted eugenol glycolic acid amides, isoeugenol glycolic acid amides and 2-methoxy-4-buten-(1)-yl phenoxy acetic acid amides.

The following examples further illustrate the production of the new compounds. Parts are given as parts by weight and their relationship to parts by volume is as that of grammes to cubic centimetres. The temperatures are in degrees centigrade.

Example 1

24 parts of 2-methoxy-4-n-propyl phenoxyacetyl chloride are added dropwise while stirring and cooling with ice into a solution of 8 parts of diethylamine and 4 parts of sodium hydroxide in 100 parts of water. The whole is stirred for 2 hours at 0° and then for a further 2 hours at room temperature. The oil which separates is taken up in ether and the ethereal solution is washed first with 2 N-hydrochloric acid, 2 N-caustic soda lye and then with water. After drying the ether solution over sodium sulphate, the ether is distilled off and the residue is distilled in a high vacuum. 2-methoxy-4-n-propyl phenoxy acetic acid-N.N-diethylamide is obtained as a viscous oil which boils at 121–123° under 0.0015 mm. pressure.

Example 2

A solution of 15 parts of diethylamine in abs. ether is added dropwise while stirring and cooling with a mixture of ice and sodium chloride to a solution of 21.5 parts of 2-methoxy-4-methylphenoxy acetic acid chloride in 150 parts by volume of abs. ether. On completion of the addition of the amine, the reaction mixture is refluxed for about half an hour, then cooled and 100 parts of water are added. The ethereal phase is separated, washed with diluted hydrochloric acid, with diluted sodium carbonate solution and, finally with water. It is dried over sodium sulphate and the solvent is distilled off. On distilling the residue, 2-methoxy-4-methyl-phenoxy acetic acid-N.N-diethylamide is obtained. B.P.$_{0.001}$ 125–128°.

If the 2-methoxy-4-methyl-phenoxy acetic acid chloride is replaced by 22.9 parts of 2-methoxy-4-ethyl-phenoxy acetic acid chloride and otherwise the same procedure is followed, then 2-methoxy-4-ethyl-phenoxy acetic acid-N.N-diethylamide is obtained. B.P.$_{0.005}$ 129–131°.

Starting from:

25.7 parts of 2-methoxy-4-n-butyl-phenoxy acetic acid chloride, 2-methoxy-4-n-butyl phenoxy acetic acid-N.N-diethyl amide is obtained, B.P.$_{0.001}$ 133–134°;

27.1 parts of 2-methoxy-4-n-amyl phenoxy acetic acid chloride, 2-methoxy-4-n-amyl-phenoxy acetic acid-N.N-diethyl amide is obtained, B.P.$_{0.002}$ 141–146°;

21.5 parts of 2-methoxy-6-methyl-phenoxy acetic acid chloride, 2-methoxy-6-methyl-phenoxy acetic acid-N.N-diethylamide is obtained, B.P.$_{0.15}$ 102–103°;

28.5 parts of 2-methoxy-4-n-hexyl-phenoxy acetic acid chloride, 2-methoxy-4-n-hexyl-phenoxy acetic acid-N.N-diethyl amide is obtained, B.P.$_{0.04}$ 152–155;

21.5 parts of 2-methoxy-3-methyl-phenoxy acetyl chloride, 2-methoxy-3-methyl-phenoxy acetic acid-N.N-diethylamide is obtained;

24.3 parts of 2-methoxy-5-n-propyl-phenoxy acetyl chloride, 2-methoxy-5-n-propyl-phenoxy acetic acid-N.N-diethylamide is obtained;

25.7 parts of 2-ethoxy-5-n-propyl-phenoxy acetyl chloride, 2-ethoxy-5-n-propyl-phenoxy acetic acid-N.N-diethylamide is obtained.

On the other hand, by reacting 24.3 parts of 2-methoxy-4-n-propyl-phenoxy acetyl chloride with 20 parts of diallylamine in a manner analogous to that described in this example, 2-methoxy-4-n-propyl-phenoxy acetic acid-N.N-diallylamide is obtained.

Also, by reacting 15 parts of pyrrolidine, 2-methoxy-4-n-propyl phenoxy acetic acid pyrrolidide is obtained;

17 parts of piperidine, 2-methoxy-4-n-propyl-phenoxy acetic acid piperidide is obtained;

25 parts of dimethallylamine, 2-methoxy-4-n-propyl-phenoxy acetic acid-N.N-dimethallylamide is obtained;

10 parts of ethylamine, 2-methoxy-4-n-propyl-phenoxy acetic acid-N-ethylamide is obtained;

13 parts of n-propylamine, 2-methoxy-4-n-propyl-phenoxy acetic acid-N-n-propylamide; and 23 parts of N-methyl-cyclohexylamine, 2-methoxy-4-n-propyl-phenoxy acetic acid-N-methyl-N-cyclohexylamide is obtained.

Example 3

24 parts of 2-methoxy-4-n-propyl phenoxy acetyl chloride are added dropwise to a solution of 13 parts of di-n-butylamine and 8 parts of abs. pyridine in 100 parts of abs. ether, the addition being made while stirring and cooling with a mixture of ice and sodium chloride. The whole is then boiled for half an hour, cooled and water is added. The ethereal phase is separated and washed first with 2 N-caustic soda lye, then with 2 N-hydrochloric acid and finally with water. It is dried over sodium sulphate, the ether is distilled off and the residue is distilled in a high vacuum.

The 2-methoxy-4-n-propyl-phenoxy acetic acid-N.N-di-n-butyl amide obtained is a viscous oil which boils at 145–146° under 0.0015 mm. pressure.

Example 4

24 parts of 2-methoxy-4-n-propyl-phenoxy acetyl chloride in 25 parts of abs. benzene are poured while stirring and cooling with ice into a solution of 24 parts of monoethyl aniline in 100 parts of abs. benzene.

The whole is boiled for half an hour, then cooled and water is added. The separated benzene phase is washed first with 2 N-hydrochloric acid, then with 2 N-caustic soda lye and finally with water. After distilling off the benzene, the residue is purified by distillation in a high vacuum. The 2-methoxy-4-n-propyl-phenoxy acetic acid-N-ethyl anilide is obtained as a viscous oil which boils at 161–163° under 0.002 mm. pressure.

In an analogous manner, by using 34 parts of N-n-propyl-4-chloraniline instead of the N-ethylaniline, 2-methoxy-4-n-propyl-phenoxy acetic acid-N-n-propyl-4'-chloranilide is obtained;

By using 45 parts of N-methallyl-4-bromaniline, 2-methoxy-4-n-propyl-phenoxy acetic acid-N-methallyl-4'-bromanilide is obtained;

By using 30 parts of N-n-propyl-p-toluidine, 2-methoxy-4-n-propyl-phenoxy acetic acid-N-n-propyl-p-toluidide is obtained;

By using 30 parts of N-ethyl-p-anisidine, 2-methoxy-4-n-propyl-phenoxy acetic acid-N-ethyl-p-anisidide is obtained;

By using 27 parts of N-allyl-aniline, 2-methoxy-4-n-propyl-phenoxy acetic acid-N-allyl anilide is obtained;

By using 22 parts of p-toluidine, 2-methoxy-4-n-propyl-phenoxy acetic acid-4'-methyl anilide is obtained;

By using 27 parts of N-ethyl-benzylamine, 2-methoxy-4-n-propyl-phenoxy acetic acid-N-ethyl-N-benzyl amide is obtained;

By using 34 parts of N-ethyl-p-chlorbenzylamine, 2-methoxy-4-n-propyl-phenoxy acetic acid-N-ethyl-N-(4'-chloro-benzyl)-amide is obtained;

By using 33 parts of N-methyl-p-isopropyl-benzylamine, 2-methoxy-4-n-propyl-phenoxy acetic acid-N-methyl-N-(4'-isopropyl-benzyl)-amide is obtained;

By using 39 parts of N-ethyl-3.4-dimethoxy-benzylamine, 2-methoxy-4-n-propyl-phenoxy acetic acid-N-ethyl-N-(3'.4'-dimethoxy-benzyl)-amide is obtained;

By using 20 parts of cyclohexylamine, 2-methoxy-4-n-propyl-phenoxy acetic acid-N-cyclohexylamide is obtained;

By using 23 parts of cyclohexyl methylamine, 2-methoxy-4-n-propyl-phenoxy acetic acid-N-(cyclohexylmethyl)-amide is obtained which, after recrystallisation from pentane, melts at 69–71°.

Example 5

232 parts of the sodium salt of 2-methoxy-4-ethyl-phenoxy acetic acid and 14 parts of diethyl carbamic acid chloride are refluxed for 6 hours in 100 parts of abs. xylene. The suspension of the sodium salt which at first is viscous gradually becomes thinly liquid and carbon dioxide is given off. On completion of the reaction, the reaction mixture is cooled, sodium chloride which has separated is filtered off under suction and washed several times with hot benzene. The benzene and xylene solutions are combined, again washed with water and diluted caustic soda lye, dried over sodium sulphate and the solvent is removed in the vacuum. On distillation of the residue, 2-methoxy-4-ethyl-phenoxy acetic acid-N.N-diethylamide, which has already been described in Example 2, is obtained.

Example 6

16.6 parts of 2-methoxy-4-n-propyl phenol are dissolved in an alcoholic caustic soda lye prepared from 4 parts of sodium hydroxide, 4 parts of water and 100 parts of ethanol. 15 parts of chloracetic acid diethylamide are added and the reaction mixture is refluxed for 7–8 hours. The greater part of the alcohol is then distilled off, water is added to the residue and the oil which separates is taken up in ether. The ethereal solution is washed with 2 N-caustic soda lye and water and dried over sodium sulphate. The ether is evaporated off and the residue is distilled in a high vacuum, whereupon 2-methoxy-4-n-propyl-phenoxy acetic acid-N.N-diethylamide, which has already been described in Example 1, is obtained.

Example 7

27.7 parts of 2-methoxy-4-allyl-phenoxy acetic acid-N.N-diethylamide are dissolved in 150 parts of distilled alcohol and, after the addition of 10 parts of Raney-nickel, are saturated with hydrogen at room temperature and normal pressure. After the theoretical amount of hydrogen has been taken up, the hydrogenation is completed in about 45 minutes. The catalyst is filtered off and washed with alcohol. The alcohol is evaporated off and the residue is distilled. 2-methoxy-4-n-propyl-phenoxy acetic acid-N.N-diethylamide, which has already been described in Example 1, is obtained.

In an analogous manner, starting from 29.1 parts of 2-ethoxy-4-allyl-phenoxy acetic acid-N.N-diethylamide, 2-ethoxy-4-n-propyl-phenoxy acetic acid-N.N-diethylamide is obtained.

Example 8

If, in the process of Example 6, the chloracetic acid diethylamide is replaced by 21 parts of α-bromo-propionic acid-N.N-diethylamide, then α-(2-methoxy-4-n-propyl-phenoxy)-propionic acid-N.N-diethylamide (B.P.$_{0.003}$ 116–120°) is obtained in the same manner.

For total anaesthesia, 100 to 500 mg. of a compound according to the present invention, e.g. 500 mg. of 2-methoxy-4-n-propyl-phenoxy acetic acid-N.N-diethylamide are used for adults. This dosage, dissolved in 10 ccm. of sterilised water containing (a) up to 40% propylene glycol together with up to about 15% sodium benzoate or up to 10% sodium salicylate, or (b), e.g. about 30% N.N-diethylacetamide as solubility promoters, is intravenously injected.

What we claim is:

1. Aryloxy acetic acid amides corresponding to the formula:

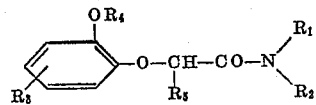

wherein:

$R_1$ represents a member selected from the group consisting of lower alkyl, lower alkenyl, cyclohexyl, phenyl, chlorophenyl, bromophenyl, methylphenyl, methoxyphenyl, benzyl, chlorobenzyl, methylbenzyl and methoxybenzyl, and $R_2$ represents a member selected from the group consisting of hydrogen, lower alkyl and lower alkenyl radicals, and $R_1$ and $R_2$ taken jointly represent a member selected from the group consisting of a tetramethylene and a pentamethylene radical, $R_3$ represents a lower alkyl radical, $R_4$ represents a lower alkyl radical, and $R_5$ represents a member selected from the group consisting of hydrogen and a lower alkyl radical.

2. 2-methoxy-4-n-propyl-phenoxy acetic acid-N.N-diethylamide.

3. 2-methoxy-4-n-propyl-phenoxy acetic acid-N-ethyl anilide.

References Cited in the file of this patent

Nametkin: Chem. Abstracts, vol. 44 (1950), cols. 1936–37.